UNITED STATES PATENT OFFICE.

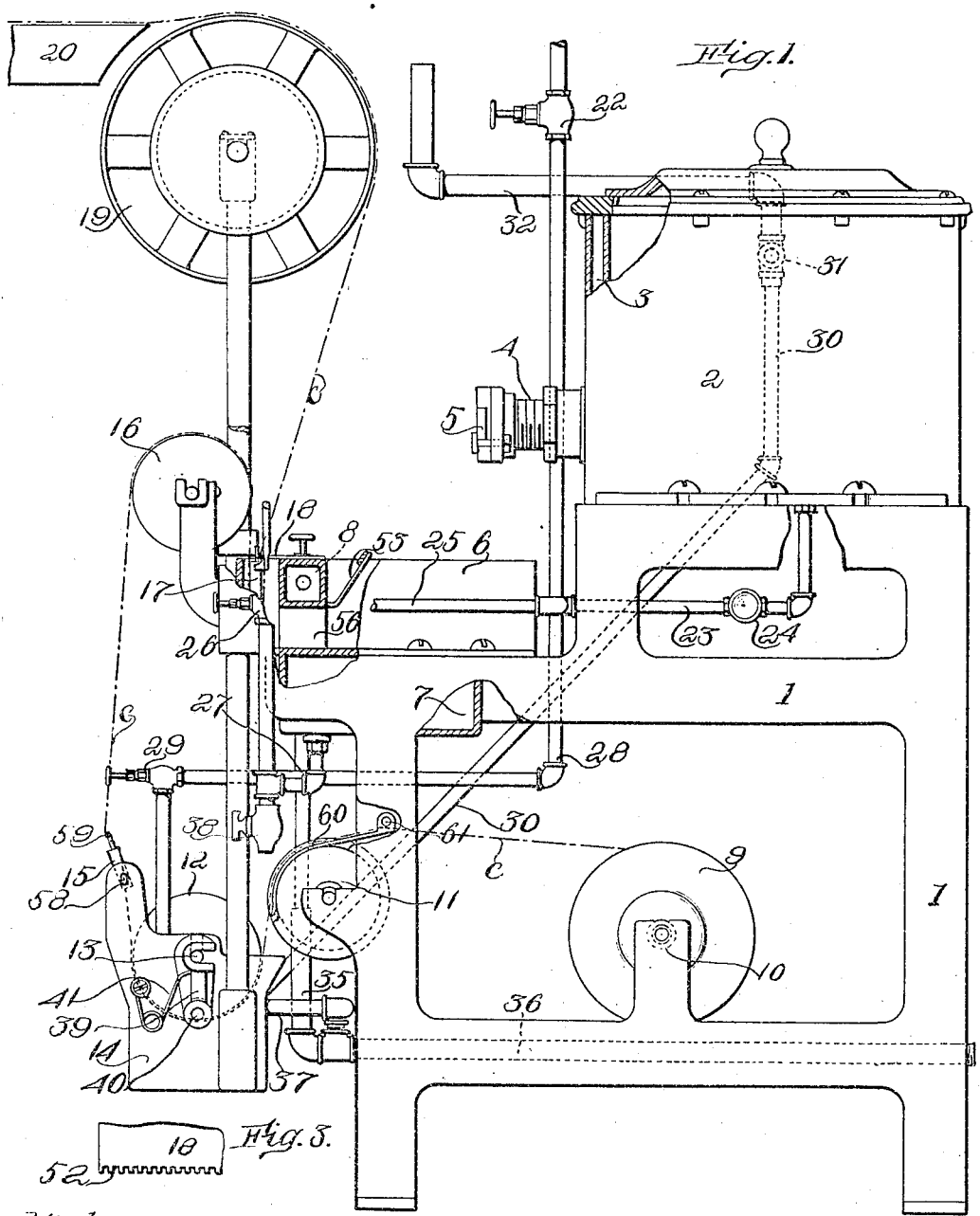

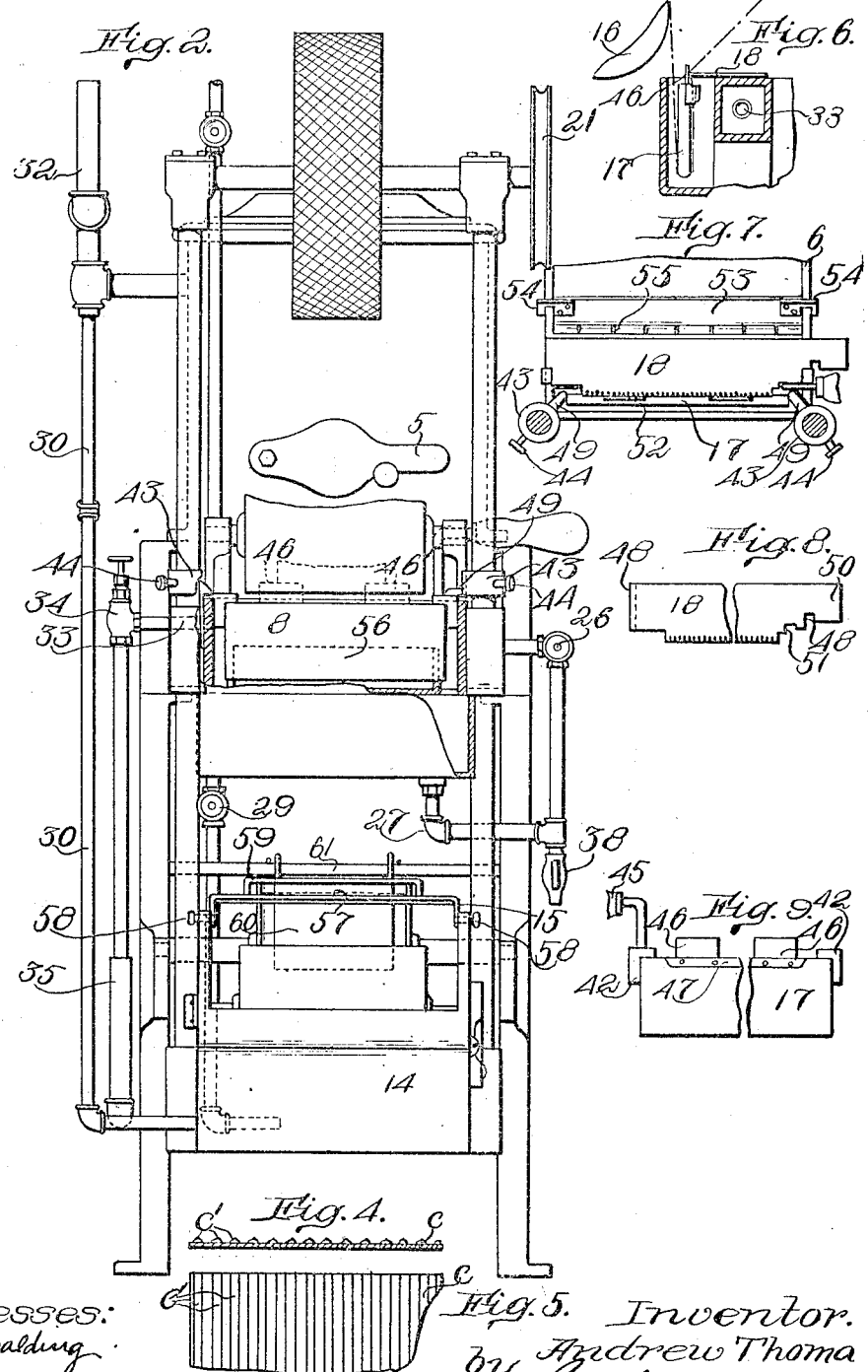

ANDREW THOMA, OF CAMBRIDGE, MASSACHUSETTS, ASSIGNOR TO THOMA CORPORATION, OF PORTLAND, MAINE, A CORPORATION OF MAINE.

MANUFACTURE OF INNERSOLES.

No. 926,711.　　　　　Specification of Letters Patent.　　　Patented June 29, 1909.

Application filed December 4, 1908. Serial No. 465,907.

*To all whom it may concern:*

Be it known that I, ANDREW THOMA, a citizen of the United States, residing at Cambridge, in the county of Middlesex and State of Massachusetts, have invented Improvements Relating to the Manufacture of Innersoles, of which the following description, in connection with the accompanying drawings, is a specification, like characters on the drawings representing like parts.

Although my invention in some of its features is capable of a wide application, it relates more particularly to the manufacture of reinforced leather innersoles known in the market as "Gem" innersoles, such as are referred to in my patents dated Feb. 13, 1906, Nos. 812,383, and 812,384. Before my invention set forth in said patents, the time-honored method of making Gem innersoles was to cement a strip of reinforcing fabric to the leather foundation constituting the innersole by means of rubber cement (naphtha solutions of rubber), which necessitated the coating of the leather with cement and then the coating of the canvas with cement, permitting both of them to dry, and then pounding them together by special machines.

My present invention has for its object the manufacture of such Gem innersoles with ordinary plain uncoated canvas or duck, cemented directly to the innersole, while avoiding the aforesaid cumbersome, expensive, objectionable and delaying features of the old method, attending the use of rubber cement.

One of the leading features of my present invention resides in the discovery of the fact that simply by first soaking the fabric with water, it becomes possible to use regular cement (*i. e.*, cement which does not contain naphtha or other volatile ingredient as in the case of rubber cements). It has heretofore been considered impracticable and in fact impossible to make a Gem innersole (*i. e.*, a canvas-reinforced innersole) by directly cementing the canvas to its foundation by ordinary cement, because the cement would penetrate the canvas, thereby losing most of its efficiency, requiring an undue amount of cement, and when hardened so stiffening the innersole that it could not be used. I have found that by first rendering the fabric pliable and cement repellent by immersing it in liquid, preferably hot water or moist steam, or otherwise swelling the fibers, the fabric may then be applied directly to the leather of the innersole by means of freshly applied ordinary cement, and that the result is a superior innersole. The application of the hot water to the cement-receiving surface fills and swells the fibers of the duck with the water, so that they cannot absorb the cement. This prevents the cement from striking in or through the fabric and restricts the cement to the surface, so that it is not absorbed and does not penetrate into the canvas and hence does not stiffen the canvas, but is all left effective on the surface for cementing purposes. Without this preliminary filling and swelling of the fibers of the duck or canvas with moisture, such as water, the application of ordinary cement would permit the latter to saturate the fibers, and such saturating of the fibers of the canvas with cement would upon the subsequent hardening of the cement separate and weaken the fibers, so as to make the fabric incapable of withstanding the stitching strain, would stiffen the fabric to the injury of the innersole, and would render the exposed surface of the canvas when on the innersole, unsightly and more or less sticky, besides wasting the expensive cement and gumming up the machines, thereby rendering it practically impossible to operate the machines at speed, because of the presence of so much cement. My method, however, obviates all these disadvantages, so that it becomes practicable and advantageous to apply the canvas to the leather by means of fresh non-volatile cement. The cement takes hold of the wet canvas sufficiently to adhere thereto but cannot follow the fiber, and all remains efficient at the surface for adhesion to the leather, so that only a comparatively thin layer of cement is required, insufficient to stiffen the innersole appreciably.

By the term "ordinary cements" I mean to include any suitable resinous, gluey, or gutta-percha cement, which is non-volatile in the sense of not having a naphtha solvent or equivalent highly volatile solvent such as characterizes the so-called rubber cements.

In the preferred form of my new method, I not only employ the fabric in an uncoated state, saturated with moisture or at least having its cement-receiving surface swelled and choked or rendered substantially impervious by the presence of moisture, and apply the resinous or gluey cement directly thereto, but I still further aid the flexibility of the sole and enhance the practicability of the method, by applying the cement in restricted areas, preferably as lines or stripes. In this way a much smaller amount of coating material will secure the desired result with the greatest efficiency. In my patented method I relied upon hot water to soften the coating as well as the fabric and to prepare it for the subsequent dry heating, whereas now I entirely eliminate this latter feature and obtain the required pliability of the innersole simply by avoiding the stiffening of the canvas by a complete and penetrative coating, depositing instead thereof an exceedingly restricted amount of cement in fine ridges or small segregated heaps accurately controlled or regulated in amount to the predetermined quantity just necessary to unite under pressure the canvas and leather. This not only renders amply sufficient an amount of cement which, if spread all over the fabric as a regular coating, would be entirely inadequate and too thin, and if applied in the usual manner of fresh cement directly to the fabric when dry, would be absorbed thereby and practically disappear, but it obviates the objectionable, deleterious and delaying effects of the water when applied on the external surface of the coating (as in my patented method), and entirely eliminates the subsequent dry heating. My apparatus besides including means for producing this preliminary filling of the fibers with moisture for the cement-repellent purposes above explained, includes special means for further limiting the amount of cement coating on the surface of the canvas and for delivering the freshly cemented canvas properly to the operator.

In the drawings, in which I have shown a preferred embodiment of the machine, Figure 1 shows the apparatus in side elevation, parts being broken away for clearness of illustration; Fig. 2 is a view thereof in front elevation, parts being broken away for the same reason; Fig. 3 is a top plan view of the scraper knife; Figs. 4 and 5 show in section and plan the fabric containing the definitely regulated lines of wet cement in readiness to be pressed directly upon the innersole body; Fig. 6 is a large sectional detail showing the position of the scraper with reference to the pilot and cement basin; Fig. 7 is a horizontal sectional view showing the front part of the cement basin and supported parts in top plan; Fig. 8 is a plan view of the scraper showing its general outline; and Fig. 9 is a view in rear elevation of the removable pilot.

In many respects I consider my invention as broadly new, but in order to present my invention clearly I will describe the same in connection with the specific details of the preferred form of my apparatus.

Mounted on a frame 1 is a cement tank 2 maintained warm by hot water in its walls as indicated at 3 and provided with an outlet 4 controlled by any suitable means as by a hand-operated valve 5 for delivering cement in proper proportions and desired amounts to a basin 6, herein shown as provided with a steam-jacketed bottom 7 and central portion 8. The basin 6 provides an excessive layer of the hot cement on the duck. The duck or canvas c is drawn in strip form from any suitable supply, herein shown as a roll 9 removably mounted on standards 10, whence the duck is led over a guide roll 11 to an immersing roll 12 removably journaled at 13 in a water tank 14. From this tank the duck is led through a tension device 15, so constructed that it scrapes off the surplus water and also provides a little drag on the strip of duck, which then passes to a guide roll 16 on the front end of the cement basin. From the guide roll 16 the duck strip is led downwardly underneath and about a pilot of fabric-guiding device 17, which is removably supported in position to depend into the cement. After the fabric has thus been coated it is led against the scraping edge of a scraper or knife 18 and thence up over a delivery wheel 19 to the work table 20, said wheel being preferably provided with a driving pulley 21 for feeding purposes. Steam is admitted by a valve 22, being delivered by a branch 23 controlled by a valve 24 to the jacket of the cement supply tank 2 and then by a branch 25 controlled by a valve 26 to the steam jacket 7 of the cement basin 6, at 27, and then by a third branch 28 controlled by a valve 29 to the water basin 14. A proper supply of water for the water tank 14 is provided through a pipe 30 tapped at 31 into the jacket 3 of the supply tank 2 so as to deliver the overflow therefrom to the water tank. A suitable vent pipe 32 is preferably provided leaning upwardly from said tap 31 to permit the escape of the entrained air and also to enable the operator to judge of the operation of the machine. An overflow pipe 33 from the steam jacketed portion of the cement basin 6 is provided, controlled by a valve 34 and emptying into an outlet pipe 35 which leads off to a drain or to a return system at 36. An overflow pipe 37 connects thereinto from the water tank. To drain the steam jacketed portion of the machine I provide a petcock 38. The rolls and other parts which are engaged by the fabric are made adjustable and removable for convenience in getting the fabric strip into place, the roll 12 being mounted in bearings 39 pivoted at 40 and normally held in roll supporting position by springs 41.

The pilot or fabric guiding tool or device 17 is shown best in Figs. 2, 6 and 9, where it will be seen that its opposite shoulders 42 are adapted to rest on the edges of the cement tank, being held in place by projecting collars 43 adjusted and tightened by set screws 44, said pilot 17 being removable by a handle 45. Projecting from the upper edge of the pilot 17 are springs 46 held in place by a block 47 to bear against the opposite sides of the fabric (see Figs. 2 and 6) so as to hold said edges pressed tightly against the scraper 18 for the purpose of preventing the cement from being drawn up by the edges of the fabric in undue amounts. The inlet supporting means, herein shown as the roll 16, and the delivery means, herein shown as the scraper blade 18, are so disposed as to compel the fabric strip to hug the pilot so closely and tightly that cement is applied to that side only of the fabric from which the surplus is scraped off by the scraping device, and notwithstanding that the entire fabric goes down into the cement no cement whatever is permitted to get on the opposite side of the fabric. To enable the fabric to be readily put in place the pilot is made removable and preferably the scraper blade or knife is also made removable. The scraper 18 is shown best in Figs. 3, 2, 6, 7 and 8, having end portions 48 to be engaged by overhanging spring clips 49, and a handle 50. The scraper blade is cut out at 51 to fit the under portions 42 of the adjacent pilot and is serrated or notched at 52 to aid in controlling definitely the amount of cement which is left thereby in ridges or longitudinal heaps or stripes on the strip of fabric being cemented. The notches control the size or extent of the ridges of cement and the teeth act to scrape off all the cement between said ridges so that the fabric c is coated with ridges or slender lines or heaps c' of cement as shown in Figs. 4 and 5. It will be obvious that the desired spots, lines or other segregated heaps or small narrow deposits of cement may be delivered to the fabric by a wide variety of mechanism, all within the spirit and scope of my invention. The serrated knife-like plate or blade is simple and effective and enables me to accomplish another very important feature already incidentally mentioned. The spreading of linear layers of cement leaves the fabric pliable and greatly facilitates the folding of the canvas over the lip portions or stitch-receiving ribs of the innersole. It helps the trimming also, by not requiring the knives to pass through a continuous layer of cement or cementitious coating (which has been the case with previous methods, including my patented invention). Each line or stripe provides a definite surplus of cement which constitutes the special means of attaching the canvas to the leather with the extreme minimum of cement which characterizes my invention, and without any danger of leaving the innersole stiff. For it will readily be understood that the raised linear body or heap of cement flattens and spreads instantly under the pounding action of the Gem innersole machine, spreading over the adjoining uncoated surface or section of the fabric, and at the same time increasing its hold or base of adhesion on the latter. Aside from the point of economy and general adaptability of this feature of my invention, I have found this lateral spreading of the cement from the linear heaps or stripes a most simple method of providing enough but not too much coating to accomplish the desired purpose. This is important, for by this means, in connection with the soaking or steaming step of my process, I can accomplish the very best results with less cement than would provide the very thinnest coating over the whole surface of the fabric, whereas with said thin coating there would not be enough cement at any one place to effect any adhesion to the leather.

At the rear of the scraper is a catch plate and strainer 53 removably supported by its hook shaped end 54 on the edge of the basin 6, for catching surplus cement, lint, threads, etc., dislodged from the fabric by the scraper, said part 53 having slits 55 in its lower part for the escape of the cement therethrough back into the basin. The central portion of the steam jacket is cut away at 6 for the free flow of cement therethrough to the front part of the basin into contact with the canvas. The scraper is removed very readily simply by pressing back one or the other of the springs 49 and lifting the blade 18 upwardly by its handle 50. If it is desired to put a new piece of canvas in place, the clamping devices 43 are swung around out of engagement with the pilot or guiding blade 17, which is then lifted out of the cement basin by means of its handle 45, and placed on top of the web of canvas. The blade 17 is then pushed downwardly into the cement basin, carrying the canvas with it, and when in place is fastened by the clamping devices or holders 43 as before. The tension device 15 consists of a scraper blade 57 whose down-turned ends are held by thumb screws 58, see Fig. 2, and a U-shaped rod 59 secured to said blade as shown clearly in Figs. 1 and 2. To hold the canvas taut and prevent its running ahead by momentum when suddenly pulled by the operator, a drag in the form of a bent plate 60 pivoted at 61 is provided to rest on the web as it passes over the guide pulley 11. The heated transverse portion or table 8 is provided for maintaining the cement extra fluid at the front portion of the basin and as it comes up on the canvas, and also for maintaining the scraper warm so as not to smear the cement but leave the ridges clean and neat.

In use the operator at the table 20 pulls the canvas along step by step as required for the individual innersoles which are to be reinforced thereby and to which the cement-striped canvas is applied by pressure. The power driven wheel 19 has practically no effect on the canvas until the latter is pulled by the operator, whereupon the preferably roughened surface of the wheel quickly grips the canvas and feeds it forward as long as the operator maintains proper tension on the canvas. As the canvas moves along it is moistened by the hot water in the tank 14 sufficiently to render the fibers of its cement-receiving surface practically impervious to cement, or in other words the water fills and swells the cotton, thereby rendering it temporarily non-absorbent so that the fibers are cement-repellent and hence when the canvas reaches the cement tank it is capable of receiving only a minimum top coating instead of being saturated by the penetrative cement. The water tempers the fabric so that it is pliable and soft and at the same time fills the pores thereof just sufficiently to prevent the cement from striking through the fabric and yet to permit the cement to adhere to the surface of the fabric. By having the water hot or by using steam, and by having the cement hot, the cement is maintained in a state of fluidity and tractability which permits the fabric to be cemented immovably to the leather sole, even after the lapse of considerable time. Not only does the presence of the moisture in the fabric prevent the penetration of the cement beyond the surface, but it coöperates with the scraper in restricting the cement to the desired minimum necessary for the purpose. Preferably the fabric is not permitted to come in contact with a hot medium after leaving the cement, or in other words I have purposely designed my apparatus to maintain the canvas-handling parts of the machine warm until the cement has been applied, whereby the cement is applied under conditions which produce in it the greatest fluidity and best conditions for surface coating without waste of the cement.

Heretofore it has been considered desirable, if not indeed necessary, to keep the surface which is to receive cement as nearly dry as possible, as it has been supposed that it would render the cementing process defective, and accordingly, the canvas has either been applied substantially dry to the innersole (as with rubber cement) or has been coated before being immersed or steamed (as in my patent No. 812,383, February 13, 1906), or has been first coated and then subsequently moistened slightly on the uncoated side or back of the canvas only (as in my patent No. 853,326, May 14, 1907), whereas by my new process herein contained the cement-receiving side of the canvas is moistened just before receiving the cement, thereby interposing this barrier of moisture for preventing the hot cement penetrating or striking too far into the fabric, and compelling said cement to remain on the surface where it is required for use. I do not intend to limit my invention to any particular cement. A gutta percha cement or other non-volatile, strongly adhesive, quick-setting cement is preferable, and the cements mentioned in my aforesaid patents or in my patent No. 855,868, dated June 4, 1907, may be used, or any other suitable cement capable of sticking to leather and canvas. The temperature of the water in the water tank 14 is regulated by the admission of more or less steam through the valve 29, while the condition of the water surrounding the supply tank 2 is noted by observing the air or steam escaping from the pipe 32. The location of the outlet pipes in the jacket of the supply tank and the cement basin insures that normally they are heated by hot water, thereby maintaining a gentle, even heat, which I have found preferable for use with the kinds of cement mentioned.

As already intimated, and as will be more apparent from the claims, I do not intend to restrict myself to the particular mechanism and specific details of the apparatus and process herein set forth at length, but have described the same herein minutely for the better comprehension of the invention. The wetting of the fabric previous to its receiving the cement prevents the soaking in of the cement, and also the segregating of the cement to separate heaps or stripes further conduces to this end.

The chief object of my invention is to prevent the stiffening of the fabric and to maintain the same extremely pliable when being shaped to conform to the innersole in the usual "gemming" process. The cement is restricted entirely to one side of the fabric, leaving the other side clean, non-stiffened, and slack, and is restricted as nearly as possible to the extreme outside surface of the fabric, as a superficial coating, and hence is entirely distinct and different from the manufacture of multi-ply fabrics, such as tarred roofing paper, glazed blotters, pasted paper articles such as boxes and photo-mounts, etc.

My invention is not to be confounded with the graining of wood or ornamental finishing of rubber cloth such as gossamer, in both of which instances the painted or coated board or cloth receives a thin coating of coloring matter which is then lined or figured by a suitable scraping tool so as to produce the desired contrasting color effect or other figured surface according to the ornamentation desired, (as in Videto, No. 371,155, patented October 4, 1887). My invention has no connection with ornamentation, and does not employ the paint-like fluid or coating required for said ornamenting purposes, but the apparatus is totally different, consisting of means for controlling a quantity of sticky cement so as to insure the heaping up on the fabric of a predetermined or certain heavy coating in segregated masses or stripes of definite quantity exactly sufficient to secure the fabric strongly to the leather of the innersole.

My apparatus is not a scratching or graining mechanism to apply a figure to a coated fabric or surface, but is an apparatus for controlling the amount of the cement by the depth of the scraper grooves. Said grooves govern the heaped up stripes as to shape and amount of cement, in accordance with the kind of cement, kind of fabric, and kind of leather surface which receives the fabric, with that predetermined nicety which will secure the most nearly perfect uniform adhesion of the fabric to the leather when vertical pressure upon the fabric causes the heaps or stripes of cement to be flattened or spread out laterally over substantially the entire surface of the leather and fabric. The rows or stripes of heaped up cement are deposited hot, when the cement would naturally have the greatest penetrating power, and the cement being quick setting remain in heaps until nearly set or in an almost or quite cold condition, whereupon the spreading pressure is applied, which operates to flatten out the cement over the intervening substantially uncoated areas when the cement has reached a comparatively non-penetrating condition. Thus in this manner, taken in connection with the preliminary swelling of the fibers with moisture, I secure the maximum efficiency of the cement for joining the two surfaces together instead of losing a great part of said efficiency because of the disappearance of a large proportion of the cement in the cloth by absorption.

Having described my invention, what I claim as new and desire to secure by Letters Patent is:

1. In the herein described method of applying woven reinforcing fabric to leather, the steps of first swelling the fibers of the cement-receiving side of the fabric with water before applying cement thereto, and then immediately applying cement directly to the wet swollen surface, the rest of the fabric including the opposite side being maintained at all times highly flexible and free from stiffening and adhesive matter.

2. The herein described method of applying woven reinforcing fabric to leather, consisting of first soaking the fibers of the cement-receiving side of the fabric with non-stiffening, non-adhesive moisture before applying cement thereto, then immediately applying cement directly to said wet surface, and finally applying the cement-coated surface of the fabric upon the leather by a pounding pressure.

3. The herein described method of applying reinforcing fabric to leather, consisting of first wetting the fabric with water and then while still wet applying thereto a minimum top coating of sticky water-repellent cement, and while the latter is still sticky applying the cemented side of the fabric to the surface of the leather, the rest of the fabric except the coated side being maintained at all times free from stiffening and adhesive agencies.

4. The herein described method of applying reinforcing fabric to leather, consisting of saturating the fabric with hot water, removing the surplus moisture therefrom, and while the fabric is still wet and warm applying a top coating of warm cement thereto, and finally applying the cemented side of the fabric under pressure against the leather.

5. The herein described method of applying reinforcing fabric to leather, consisting of subjecting the fabric to a hot wet bath, then subjecting the wet surface of the fabric to an excessive coating of hot cement, scraping said cement therefrom so as to leave an accurately determined minimum top coating thereof on the canvas, and applying said cemented canvas to the leather.

6. The herein described method of applying reinforcing fabric to leather, consisting of subjecting the cement-receiving side of the fabric to moisture sufficient to substantially saturate the fibers of said side of the fabric before applying cement thereto, then applying to said side of the fabric a minimum top coating of sticky cement, segregating said coating to a series of narrow heaps or separated areas of cement in predetermined definite quantity proportioned to the kind of fabric and base to be united, so as to result, under the application of pressure, in the union of the two surfaces by a practically continuous film of cement, and finally applying the cemented side of the fabric under pressure to the leather.

7. The herein described method of applying reinforcing fabric to leather, consisting of providing one surface of the fabric with segregated deposits of sticky cement in predetermined definite quantity, the opposite surface and a substantial portion of the interior of the fabric being maintained entirely free from cement, and then pressing said coated surface forcibly against the leather.

8. The herein described method of applying reinforcing fabric to leather, consisting of applying to the fabric a series of narrow heaps of cement in predetermined definite quantity, said heaps having a self-sustaining consistency, the opposite surface and a substantial portion of the interior of the fabric being maintained entirely free from cement, applying said fabric to the leather and then flattening said heaps of cement down over the leather and fabric by pressure on said narrow heaps of cement.

9. The herein described method of applying reinforcing fabric to a leather innersole, consisting of providing separated stripes of cement extending longitudinally of the fabric, and then applying said fabric under pressure lengthwise of the innersole whereby there is a minimum deposit of cement and extent of cemented area in the path of the trimming knives when the innersole is subsequently subjected thereto.

10. The method of applying reinforcing fabric to a leather innersole, consisting of applying cement over one surface only of a piece of reinforcing fabric, maintaining the rest of the body of the fabric and the opposite side thereof pliable and entirely free of stiffening and cementitious matter, and scraping the cement off from segregated areas, leaving intervening cement deposits sufficient in number, depth and location to effect the subsequent union of the fabric to the leather, and finally applying the cemented side of the fabric under pressure against the leather.

11. The method of applying reinforcing fabric to a leather innersole, consisting of coating one surface of a length of reinforcing fabric by passing the fabric through a body of cement so that only said one surface receives cement and the rest of the fabric is kept clean of cement, and then removing most of the cement in longitudinal stripes from said one surface, leaving intervening surplus deposits of cement sufficient in mass to effect, by the aid of pressure, the subsequent union of the fabric to the article to be reinforced, immediately cooling the said surplus deposits so as to maintain them in place without spreading and finally applying the cemented side of the fabric under pressure against the leather.

12. The method of applying reinforcing fabric to a leather innersole, consisting of applying cement to reinforcing fabric and causing the cement to become set in position in alternate self-sustaining thick and thin layers so that the thick layers may subsequently be spread by vertical pressure sufficiently to secure the fabric to the article to be reinforced, and then applying the fabric lengthwise of the innersole and subjecting it to vertical pressure.

13. A reinforcing fabric for application to a body by self-adhesion under pressure, having an adhesive coating of sticky cement restricted to fine, linear segregated self-sustaining heaps proportioned in quantity and size to the character of the fabric and body, the body of the fabric and side opposite said coating being entirely free of stiffening and cementitious matter, the intervening areas of the coated side of said fabric between said heaps being highly pliable to enable the fabric readily to conform to the receiving body, and the cement being sufficient in amount to flatten out under pressure, when substantially set, so as approximately to cover the entire surfaces to be united.

14. The herein described apparatus for use in making innersoles, comprising means for supplying sticky cement, provided with heating means to maintain the cement in a free-flowing condition, means for applying said cement to a strip of fabric and restricting said application to one side only of said fabric, and regulating means for controlling the amount of cement deposited on said fabric and restricting the cement to small segregated areas on the surface of the fabric.

15. The herein described apparatus for cementing reinforcing fabric, comprising means for delivering permanently sticky cement, means for the passage of a strip of fabric through the sticky cement including means to restrict the cement entirely to one side of the fabric, and heated means for heaping up the cement in narrow linear layers of predetermined, definite extent and quantity, on said fabric and scraping the intervening portions of cement therefrom.

16. The herein described apparatus for cementing reinforcing fabric, comprising a heated cement basin, means for delivering a strip of fabric into said basin and restricting the cement to one side thereof only, and a scraper having a serrated edge for removing most of the cement from said side and leaving fine linear stripes or areas of cement deposited thereon in a heaped-up, sticky condition ready to be flattened down upon the article receiving the fabric.

17. The herein described apparatus for cementing reinforcing fabric, comprising a cement basin, deflecting means for deflecting a strip of fabric into the cement in said basin, said means and the adjacent parts of the apparatus being constructed and operating to maintain one side of the strip clean of cement as the other side is being freely covered with cement as the strip passes through the basin, and a scraper for controlling the amount of cement left on the fabric as it passes through the apparatus, said scraper having regulating notches for producing linear heaps or rows of sticky cement in position to be subsequently flattened down by pressure upon the leather innersole to which it is thereby cemented.

18. The herein described apparatus for cementing reinforcing fabric, comprising means for moistening a strip of fabric passed therethrough, means for subsequently applying a top coating of cement to the moistened surface of said strip of fabric, and regulating means for removing all surplus cement, the before mentioned apparatus being constructed and operating to restrict the application of the cement to one side only of the fabric.

19. The herein described apparatus for cementing reinforcing fabric, comprising means for moistening a strip of fabric passed therethrough, means for subsequently applying a top coating of cement to the moistened surface of said strip of fabric, regulating means for removing all surplus cement, the before mentioned apparatus being constructed and operating to restrict the application of the cement to one side only of the fabric, and means for heating said moistening means and said cementing means.

20. The herein described apparatus for cementing reinforcing fabric, comprising a cement basin, a plate-like stationary fabric-guiding device set edgewise into the cement in the basin, and coöperating means for receiving and guiding a strip of fabric in position to pass close against said plate-like guiding device down on one side thereof into the cement and up on the other side thereof out of the cement.

21. The herein described apparatus for cementing reinforcing fabric, comprising a cement basin, a plate-like stationary fabric-guiding device set edgewise into the cement in the basin, and coöperating means for receiving and guiding a strip of fabric in position to pass close against said plate-like guiding device down on one side thereof into the cement and up on the other side thereof out of the cement, said coöperating means being adjusted to cause the fabric to hug tightly against said guiding device so as to maintain the surface of the fabric which rests against the guiding device entirely free from cement.

22. The herein described apparatus for cementing reinforcing fabric, comprising a cement basin, a plate-like fabric-guiding device movable downwardly into the cement for directing a strip of fabric into the cement, means coöperating with said guiding device to confine the cement entirely to one side of the fabric and a horizontal scraper provided with notches to engage the fabric after it has left the cement and control the amount of cement left on the fabric and heap up the same in segregated ridges ready to be flattened down upon the article receiving said fabric.

23. The herein described apparatus for cementing reinforcing fabric, comprising means for moistening a strip of fabric passed therethrough, means for subsequently applying a top coating of cement to the moistened surface of said strip of fabric, regulating means for removing all surplus cement, the before mentioned apparatus being constructed and operating to restrict the application of the cement to one side only of the fabric, and means for maintaining the fabric taut throughout its aforesaid travel.

24. In an apparatus of the kind described, a cementing basin for applying cement to one side of a strip of fabric, means in said basin for directing the strip into and out of the cement, and heated means close to said directing means and strip for maintaining the cement at that part of the basin and on the strip in a highly fluid condition.

25. In an apparatus of the kind described, a cementing basin for applying cement to one side of a strip of fabric, guiding means for guiding the fabric into and out of the cement, a scraper projecting above said guiding means for scraping surplus cement from said strip, and a heated supporting wall close to said guiding means and in contact with said scraper for maintaining said parts hot and the adjacent cement in a highly fluid condition during the passage of the strip.

26. In an apparatus of the kind described, a cementing basin, guiding means for guiding a strip of fabric therethrough, means coöperating therewith in restricting the cement entirely to one side of the fabric a scraper for scraping surplus cement therefrom, and yielding pressure mechanism for pressing said strip against said scraper.

27. In an apparatus of the kind described, a cementing basin, guiding means for guiding a strip of fabric therethrough, a scraper for scraping surplus cement therefrom, and yielding pressure mechanism for pressing said strip against said scraper at the edges of the fabric whereby an excess of cement is prevented at said edges.

28. In an apparatus of the kind described, means for applying cement to one side of a strip of fabric, a delivery wheel over which the fabric passes loosely, and power means for continually driving said wheel, the tightening of the fabric by the pull of the operator causing the wheel to forcibly feed the fabric forward.

29. In an apparatus of the kind described, means for applying cement to one side of a strip of fabric, controlling scraper mechanism for regulating to a predetermined definiteness the amount of cement left on said side of said strip, a delivery wheel over which the fabric passes loosely, and power means for continually driving said wheel, the tightening of the fabric by the pull of the operator causing the wheel to forcibly feed the fabric forward.

30. In an apparatus of the kind described, a cementing basin, guiding means for guiding a strip of fabric into position to receive a coating of cement, a scraper removably mounted on said basin in position to remove surplus cement from said strip, and spring retainers for interlocking with the opposite ends of said scraper at the opposite sides of the basin for removably holding said scraper.

31. In an apparatus of the kind described, a source of fabric-strip-supply, a guide roll, a drag for retarding the passage of the strip over said guide roll, a moistening tank for receiving said strip, a cementing tank, guiding means for guiding the strip from said moistening tank into said cementing tank to receive cement on one side of the strip, a scraper for removing surplus cement, and a delivery wheel for delivering the strip from the apparatus.

In testimony whereof, I have signed my name to this specification, in the presence of two subscribing witnesses.

ANDREW THOMA.

Witnesses:
M. J. SPALDING,
EDWARD MAXWELL.